(12) United States Patent
Numata et al.

(10) Patent No.: US 7,575,729 B2
(45) Date of Patent: Aug. 18, 2009

(54) FUEL REFORMING APPARATUS AND METHOD OF CONTROLLING THE FUEL REFORMING APPARATUS

(75) Inventors: Koichi Numata, Mishima (JP); Satoshi Iguchi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1035 days.

(21) Appl. No.: 09/883,966

(22) Filed: Jun. 20, 2001

(65) Prior Publication Data

US 2002/0000067 A1 Jan. 3, 2002

(30) Foreign Application Priority Data

Jun. 28, 2000 (JP) .............................. 2000-194084

(51) Int. Cl.
*B01J 8/02* (2006.01)
(52) U.S. Cl. .................... 422/211; 422/222; 422/177; 422/180; 422/129; 208/347; 526/908; 165/119; 60/273; 60/311; 431/268; 126/280
(58) Field of Classification Search ................ 422/177, 422/180, 179, 175, 211, 222, 221, 178; 252/262; 106/122; 220/592.2; 126/375.1; 55/523
See application file for complete search history.

(56) References Cited

U.S. PATENT DOCUMENTS

| | | | |
|---|---|---|---|
| 4,036,180 A * | 7/1977 | Noguchi et al. ................ 123/3 |
| 4,522,894 A * | 6/1985 | Hwang et al. .................. 429/17 |
| 4,855,267 A | 8/1989 | Cheng .......................... 502/50 |
| 4,934,142 A * | 6/1990 | Hayashi et al. ................ 60/297 |
| 4,981,676 A | 1/1991 | Minet et al. ................... 423/652 |
| 5,098,455 A * | 3/1992 | Doty et al. ..................... 55/523 |
| 5,750,026 A * | 5/1998 | Gadkaree et al. ......... 210/502.1 |
| 5,758,496 A * | 6/1998 | Rao et al. ...................... 60/295 |
| 5,855,781 A * | 1/1999 | Yorita et al. ............ 210/321.82 |
| 5,956,560 A * | 9/1999 | Dorfman et al. .............. 419/38 |
| 6,149,859 A * | 11/2000 | Jahnke et al. ................ 266/154 |
| 6,348,278 B1 * | 2/2002 | LaPierre et al. ............... 429/17 |
| 6,576,203 B2 * | 6/2003 | Abe et al. .................... 422/191 |
| 2002/0054837 A1 * | 5/2002 | Abe et al. .................... 422/174 |

FOREIGN PATENT DOCUMENTS

| | | |
|---|---|---|
| DE | 1 246 688 B | 2/1968 |
| DE | 197 25 007 C1 | 3/1999 |
| DE | 196 18 816 C2 | 8/1999 |

(Continued)

*Primary Examiner*—Alexa D. Neckel
*Assistant Examiner*—Kaity V. Handal
(74) *Attorney, Agent, or Firm*—Oliff & Berridge, PLC

(57) ABSTRACT

A fuel reforming apparatus includes a reforming catalyst, a filtering member, a raw material supply flow passage and a processed gas flow passage. The filtering member has a plurality of cells. A reforming catalyst is carried on a surface of a partition on the side of the processed gas flow passage. If raw gas including hydrocarbon fuel is supplied to the fuel reforming apparatus and filtered by the filtering member, soot included in the raw gas is trapped by gaps in the partition, and the hydrocarbon fuel is reformed into reformed gas including hydrogen and carbon monoxide on the reforming catalyst. By increasing the amount of air supplied from a blower at intervals of time, the soot trapped by the partition is removed by combustion.

13 Claims, 4 Drawing Sheets

FOREIGN PATENT DOCUMENTS

| | | |
|---|---|---|
| DE | 198 04 286 A1 | 8/1999 |
| EP | 0 228 885 A2 | 7/1987 |
| JP | 01042301 A | 2/1989 |
| JP | 04200640 A | 7/1992 |
| JP | 7-215702 A | 8/1995 |
| JP | 8-188784 A | 7/1996 |
| JP | 8-253301 A | 10/1996 |
| JP | 11-314901 A | 11/1999 |
| JP | 2000-63101 A | 2/2000 |

* cited by examiner

FUEL REFORMING APPARATUS AND METHOD OF CONTROLLING THE FUEL REFORMING APPARATUS

INCORPORATION BY REFERENCE

The disclosure of Japanese Patent Application No. 2000-194084 filed on Jun. 28, 2000, including the specification, drawings and abstract is incorporated herein by reference in its entirety.

BACKGROUND OF THE INVENTION

1. Field of Invention

The invention relates to a fuel reforming apparatus and to a method of controlling the fuel reforming apparatus and, more particularly, to a fuel reforming apparatus for reforming hydrocarbon fuel into hydrogen-rich fuel gas and to a method of controlling the fuel reforming apparatus.

2. Description of Related Art

Conventionally, as a fuel reforming apparatus of this type, there is proposed one that completely burns about half of hydrocarbon fuel and that subjects the other half to a partial oxidation reaction. For example, such a fuel reforming apparatus is disclosed in Japanese Patent Application Laid-Open No. 7-215702. In this apparatus, water vapors resulting from complete combustion and carbon monoxide resulting from the partial oxidation reaction are shifted to hydrogen and carbon dioxide through a shift reaction, whereby the yield of hydrogen is enhanced and production of soot is restrained. The "yield of hydrogen" means a ratio of an amount of hydrogen that has been produced actually to an amount of hydrogen that is to be obtained theoretically from raw materials in a chemical process.

However, such a fuel reforming apparatus has difficulty in restraining generation of soot completely. Even if hydrocarbon fuel is burnt completely under a stoichiometric air-fuel ratio, it is impossible to mix hydrocarbon fuel with air completely and cause complete combustion in the entire mixture, and it is difficult to always maintain a state of the precisely stoichiometric air-fuel ratio due to gauge errors resulting from supply of hydrocarbon fuel and air. Thus, a small amount of soot is generated because of the carbon in the hydrocarbon fuel.

In the above fuel reforming apparatus, generation of soot is restrained by supplying hydrocarbon fuel to be burnt completely with air of an amount slightly larger than an amount corresponding to the stoichiometric air-fuel ratio. However, even in this case, there is caused a problem of difficulty in obtaining a completely mixed state and realizing complete combustion in the entire mixture.

SUMMARY OF THE INVENTION

The invention has been made as a solution to the above problem. It is an object of the invention to provide a fuel reforming apparatus that traps soot that is generated from carbon in hydrocarbon fuel.

A fuel reforming apparatus according to the invention reforms hydrocarbon fuel into hydrogen-rich fuel gas. The fuel reforming apparatus includes a raw material supply flow passage through which raw gas flows, a filtering member, and a processed gas flow passage through which filtered gas flows. The filtering member is formed from an interstitial material having a plurality of gaps with a diameter equal to or smaller than a selected effective diameter, and carries a reforming catalyst. During filtration based on operation of the reforming catalyst, the filtering member reforms the raw gas supplied from the raw material supply flow passage into reformed gas including hydrogen.

In a fuel reforming apparatus having such a construction, soot that can be produced when the raw gas is reformed into reformed gas, and soot that can be produced based on a rise in temperature of the raw material, can be trapped during its passage through the filtering member.

BRIEF DESCRIPTION OF THE DRAWINGS

The objects, features, advantages, technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the invention will be described in detail in terms of preferred embodiments.

Figure 1:
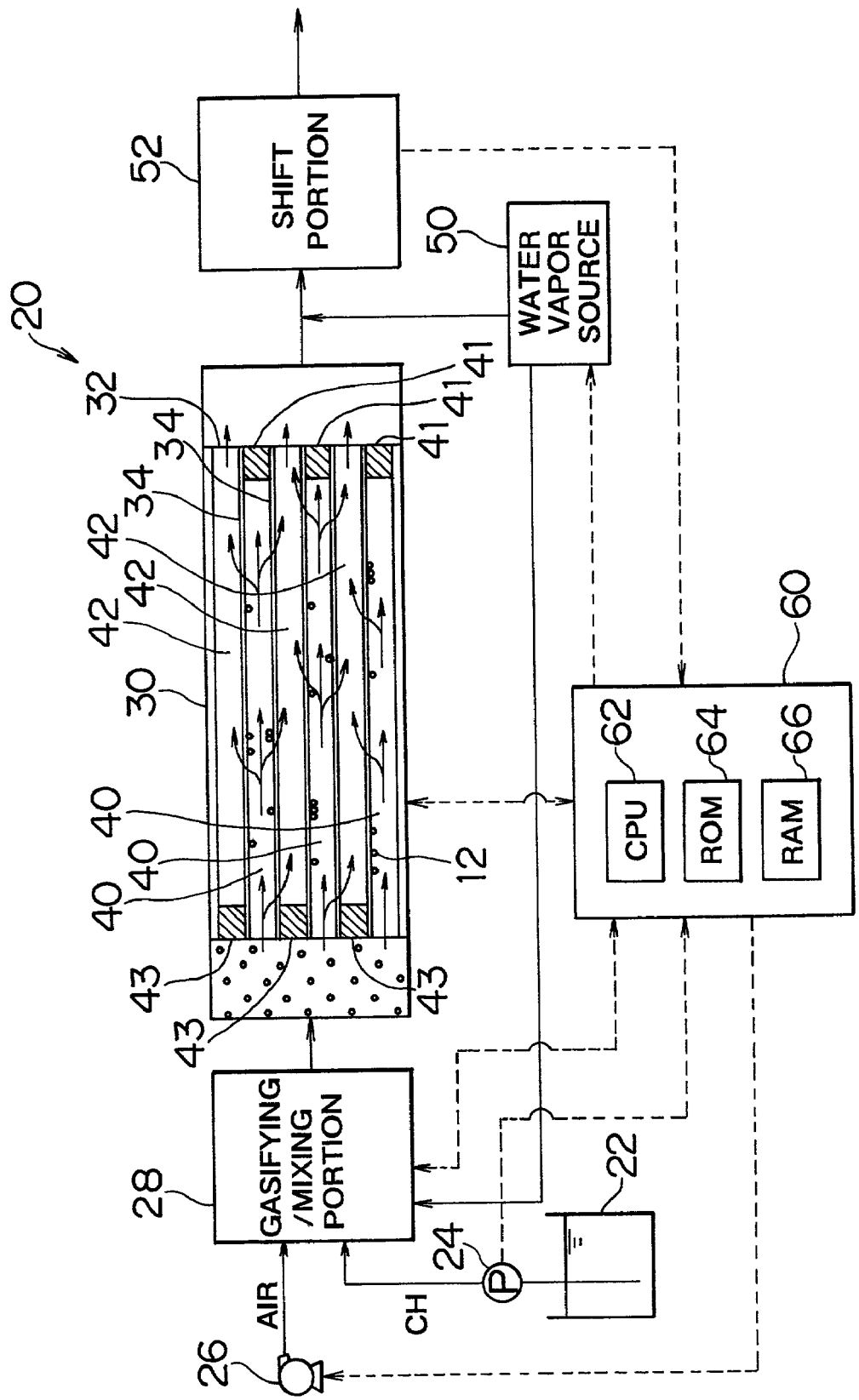
FIG. 1 is a block diagram of an overall construction of a fuel reforming apparatus according to first and second embodiments of the invention.

A first embodiment of the invention will be described with reference to the drawings. FIG. 1 is a block diagram showing an overall construction of a fuel reforming apparatus 20 as an example. As shown in FIG. 1, the fuel reforming apparatus 20 includes a gasifying/mixing portion 28 (or raw material preparing portion), a reforming portion 30, a shift portion 52, and an electronic control unit 60. The gasifying/mixing portion 28 is supplied with hydrocarbon fuel (e.g., gasoline and the like) from a fuel tank 22 by a fuel pump 24, air by a blower 26, and water vapor from a water vapor source 50. The gasifying/mixing portion 28 gasifies the hydrocarbon fuel and mixes it with the air and the water vapor, thus generating raw gas. The reforming portion 30 reforms the raw gas into reformed gas including hydrogen and carbon monoxide. The shift portion 52 shifts water vapor and carbon monoxide in the mixture of reformed gas and water vapor supplied from the water vapor source 50, into hydrogen and carbon dioxide. The electronic control unit 60 controls the entire apparatus.

An aspect of the invention is directed to the structure of the reforming portion 30 and preparation of raw gas to be supplied to the reforming portion 30. The following is a detailed description of the structure of the reforming portion 30 and preparation of raw gas. Gasoline is used as hydrocarbon fuel in the fuel reforming apparatus 20 of this embodiment. The reforming portion 30 is operated at a temperature of about 600 to about 1000° C. where a reforming catalyst is activated, whereas the shift portion 52 is operated at a temperature of about 200 to about 600° C. where a shift reaction catalyst is activated.

The reforming portion 30 has a honeycomb filter 32. The honeycomb filter 32 has honeycomb tubes which include a plurality of cells. A raw material supply flow passage 40 is formed by closing a gas outlet of half of the cells (shown on the right side of FIG. 1) with a plug 41, and a processed gas flow passage 42 is formed by closing a gas inlet of the other half of the cells (shown on the left side of FIG. 1) with a plug 43. This honeycomb tube is made from a suitable material, such as a sintered material, non-woven fabric, a foamed material, a mesh material, and a porous material having a plurality of gaps with an effective diameter equal to or smaller than about 100 μm. Although this is a carrier having an integral structure, i.e., a monolithic substrate, it is perforated with regular holes (in the shape, e.g., of a square, a triangle or a hexagon) and is therefore called a honeycomb tube. The raw material supply flow passages 40 and the processed gas flow passages 42 are disposed adjacent to each other, with a filtering member (which defines a partition 34 and thus will be referred to hereinafter as a "partition") interposed therebetween. Raw gas supplied from the raw material supply flow passage 40 penetrates the partition 34 and is discharged from the processed gas flow passage 42.

Figure 2:
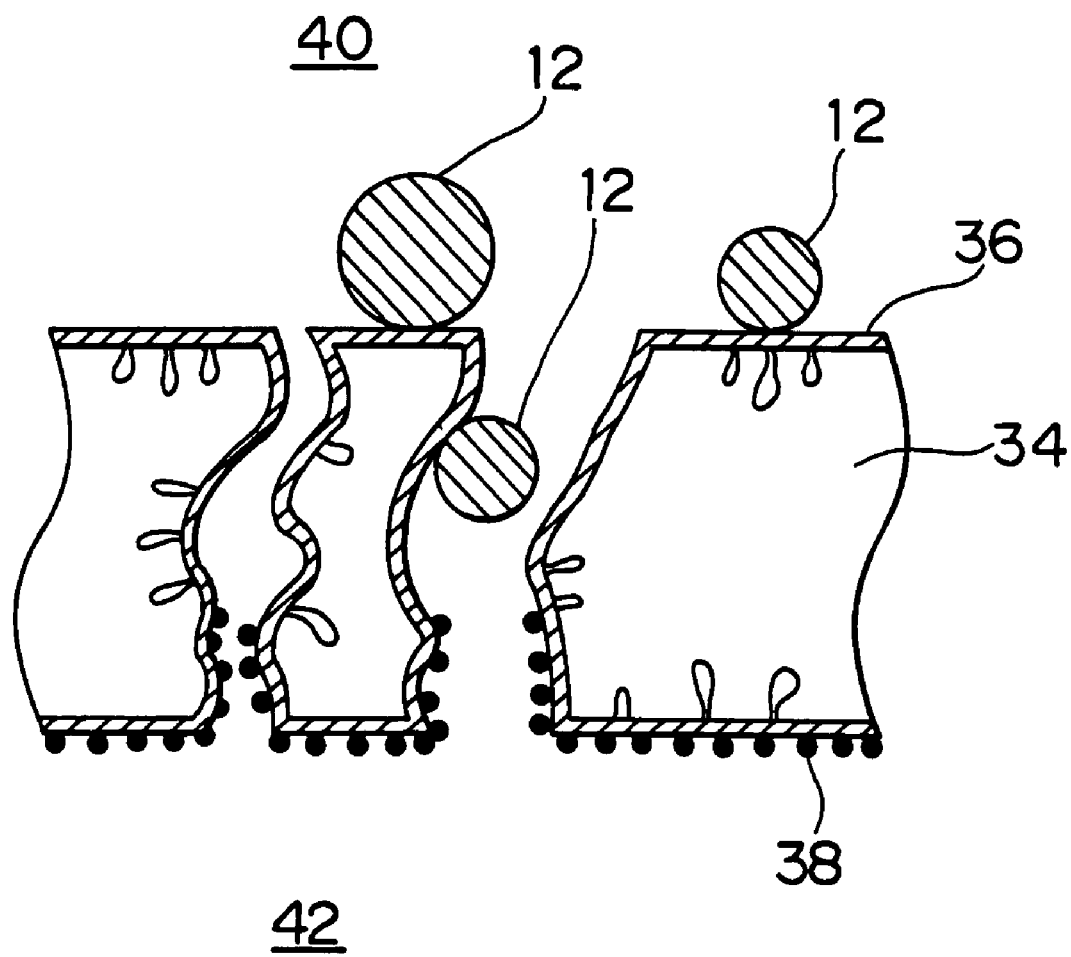
FIG. 2 is an enlarged schematic diagram that schematically shows on an enlarged scale a partition of a honeycomb filter according to the first embodiment of the invention.

FIG. 2 shows on an enlarged scale the partition 34 of the honeycomb filter 32. As shown in FIG. 2, a surface of the partition 34 of the honeycomb filter 32 is coated with a coating 36 made from an inactive material, such as alumina or the like. A reforming catalyst 38 (e.g., platinum (Pt), palladium (Pd), rhodium (Rh), nickel (Ni) and the like), which reforms hydrocarbon fuel into reformed gas including hydrogen and carbon monoxide, is carried on a surface on the side of the processed gas flow passage 42 and in a plurality of gaps on the side of the processed gas flow passage 42. Accordingly, when penetrating the partition 34 as a filtering member, raw gas supplied from the raw material supply flow passage 40 causes a reforming reaction on the reforming catalyst 38 carried in the gaps of the partition 34 and on the reforming catalyst 38 carried on the side of the processed gas flow passage 42. As shown in FIG. 1, the raw material supply flow passages 40 and the processed gas flow passages 42 are disposed parallel to each other and along the partition 34, with the partition 34 interposed therebetween. Thus, even if unreacted hydrocarbon fuel exists in gas that has penetrated the partition 34, the unreacted hydrocarbon fuel comes into contact with the reforming catalyst 38 carried on the partition 34 on the side of the processed gas flow passage 42 while flowing through the processed gas flow passage 42, causes a reforming reaction, and is turned into reformed gas including hydrogen and carbon monoxide.

In this case, the gaps in the partition 34 have an effective diameter equal to or smaller than about 100 μm. This effective diameter ensures that soot 12, which has a particle diameter of about dozens of micrometers and which results from carbon that constitutes gasoline as hydrocarbon fuel when the gasoline is mixed with air and heated to a temperature of about 600 to about 1000° C., will be trapped by the partition 34. The effective diameter of the gaps in the partition 34 may be selected according to the type of hydrocarbon fuel to be used, the state of mixture achieved by the gasifying/mixing portion 28, the operating condition of the reforming portion 30, and other factors. For example, the effective diameter may assume various values including about 1000 μm, about 500 μm, about 100 μm, about 70 μm, about 50 μm, about 30 μm, about 20 μm, about 10 μm and other suitable values.

The electronic control unit 60 is constructed as a microprocessor including a CPU 62, and has a ROM (read only memory) 64 in which processing programs are stored, a RAM (random access memory) 66 for temporarily storing data, and an I/O port (not shown). Temperature signals, flow rate signals and other signals indicating operation states of the gas-ifying/mixing portion 28, the reforming portion 30, and the shift portion 52 are inputted to the electronic control unit 60 via input ports. A drive signal for the fuel pump 24, a drive signal for the blower 26, control signals for the gasifying/mixing portion 28, the reforming portion 30 and the shift portion 52, a drive signal for the water vapor source 50, and other signals are outputted from the electronic control unit 60 via output ports.

Next, it will be described how the thus-constructed fuel reforming apparatus 20 of the first embodiment operates, especially how the soot 12 is trapped by the reforming portion 30, how a reforming reaction occurs, and how the trapped soot 12 is removed. In the description of the construction of the reforming portion 30, it has been described how the soot 12 is trapped by the reforming portion 30 and how the reforming reaction occurs. That is, when the honeycomb filter 32 filters raw gas, the soot 12 included in the raw gas is trapped on surfaces of a plurality of gaps formed in the partition 34 or in the gaps, and hydrocarbon fuel included in the raw gas is reformed into reformed gas including hydrogen and carbon monoxide on the reforming catalyst 38 that is carried on the surfaces of the gaps formed in the partition 34 and on the surface of the partition 34 on the side of the processed gas flow passage 42. Even if unreacted hydrocarbon fuel exists in gas that has penetrated the partition 34, the unreacted hydrocarbon fuel comes into contact with the reforming catalyst 38 carried on the partition 34 on the side of the processed gas flow passage 42 while flowing through the processed gas flow passage 42, causes a reforming reaction, and is reformed into reformed gas including hydrogen and carbon monoxide.

Figure 3:
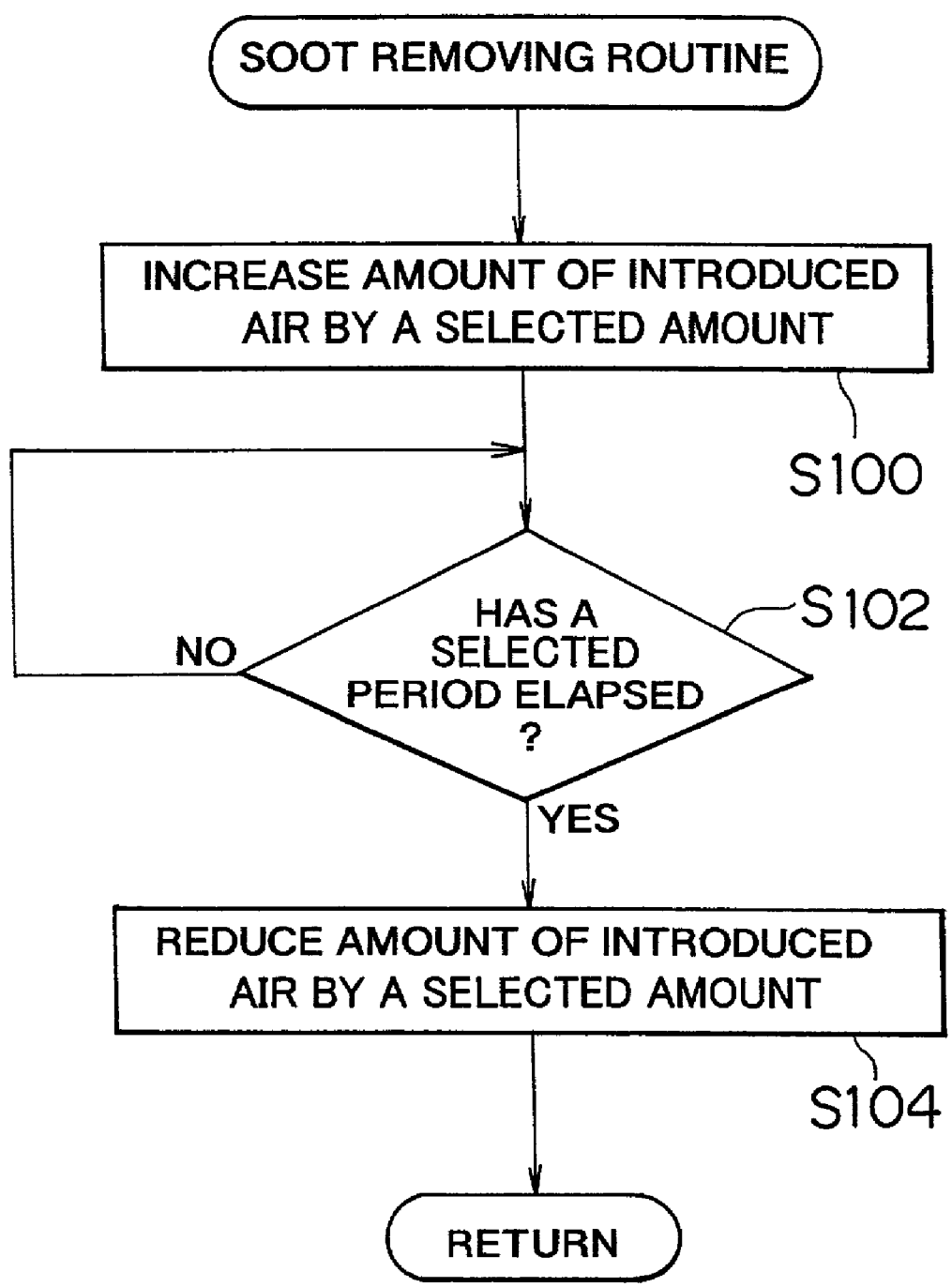
FIG. 3 is a flowchart showing an exemplary soot removing routine executed by an electronic control unit of the fuel reforming apparatus according to the first and second embodiments of the invention.

The soot 12 that has been trapped by the partition 34 of the honeycomb filter 32 is removed by executing a soot removing routine, such as the exemplary routine shown in FIG. 3. This routine is repeatedly executed at intervals of a selected period (e.g., 2 h). Upon execution of the soot removing routine, first of all in step S100, the CPU 62 of the electronic control unit 60 outputs a drive signal to the blower 26 so as to increase the amount of air introduced into the gasifying/mixing portion 28 from the blower 26 by a selected or predetermined amount. The CPU 62 then proceeds to step S102 and determines whether or not a selected or predetermined period has elapsed. If the result of step S102 is YES, the CPU 62 proceeds to step S104, performs processings of resetting the increased amount of the introduced air as an initial amount, and terminates the present routine. If the result of step S102 is NO, the CPU 62 returns to step S102 again. If the amount of introduced air is increased, raw gas with an increased ratio of air is supplied to the honeycomb filter 32. The soot 12 trapped by the surface of the partition 34 of the honeycomb filter 32, or in the gaps formed in the partition 34 of the honeycomb filter 32, is composed of carbon particles. Therefore, the soot 12 is burnt by oxygen in air, turns into carbon dioxide reaches the side of the processed gas flow passage 42, and is removed. Accordingly, the predetermined period in step S102 is set in consideration of the period required for supplying an amount of air that allows all or most of the soot 12 that is trapped by the partition 34 while the soot removing routine is executed repeatedly to be removed by combustion and for burning the soot 12.

According to the fuel reforming apparatus 20 of the embodiment described hereinbefore, the honeycomb filter 32 that has a plurality of gaps with an effective diameter equal to or smaller than about 100 μm and that carries the reforming catalyst 38 filters raw gas, whereby it becomes possible to trap the soot 12 included in the raw gas and efficiently reform the raw gas into reformed gas including hydrogen and carbon monoxide. Moreover, the raw material supply flow passage 40 and the processed gas flow passage 42 are formed parallel to each other and along the partition 34, with the partition 34 interposed therebetween. Therefore, even if unreacted hydrocarbon fuel exists in gas after filtration, a reforming reaction can be caused through contact of the partition 34 with the reforming catalyst 38 that is carried downstream of the processed gas flow passage 42. Further, since the honeycomb filter 32 having a large filtration area is employed, the reforming portion 30 and thus the apparatus can be made compact.

Further, according to the fuel reforming apparatus 20 of the first embodiment, the soot 12 trapped by the partition 34 of the honeycomb filter 32 can be removed by combustion by executing the soot removing routine at intervals of the selected period. Because the soot 12 is removed by increasing a ratio of air in raw gas, there is no need to stop operation of the apparatus to remove the soot 12.

In the fuel reforming apparatus 20 of the first embodiment, the reforming catalyst 38 is carried on the surfaces of the gaps formed in the partition 34 of the honeycomb filter 32 on the side of the processed gas flow passage 42 and on the surface of the partition 34 on the side of the processed gas flow passage 42. However, the reforming catalyst 38 may be carried on the entire surfaces of the gaps, or may also be carried on the surface of the partition 34 on the side of the raw material supply flow passage 40.

In the fuel reforming apparatus 20 of the first embodiment, the surface of the partition 34 of the honeycomb filter 32 on the side of the raw material supply flow passage 40 is coated with the coating 36 made from an inactive material such as alumina or the like. However, in embodiments, the surface of the partition 34 may alternatively not be coated with the coating 36.

Figure 4:
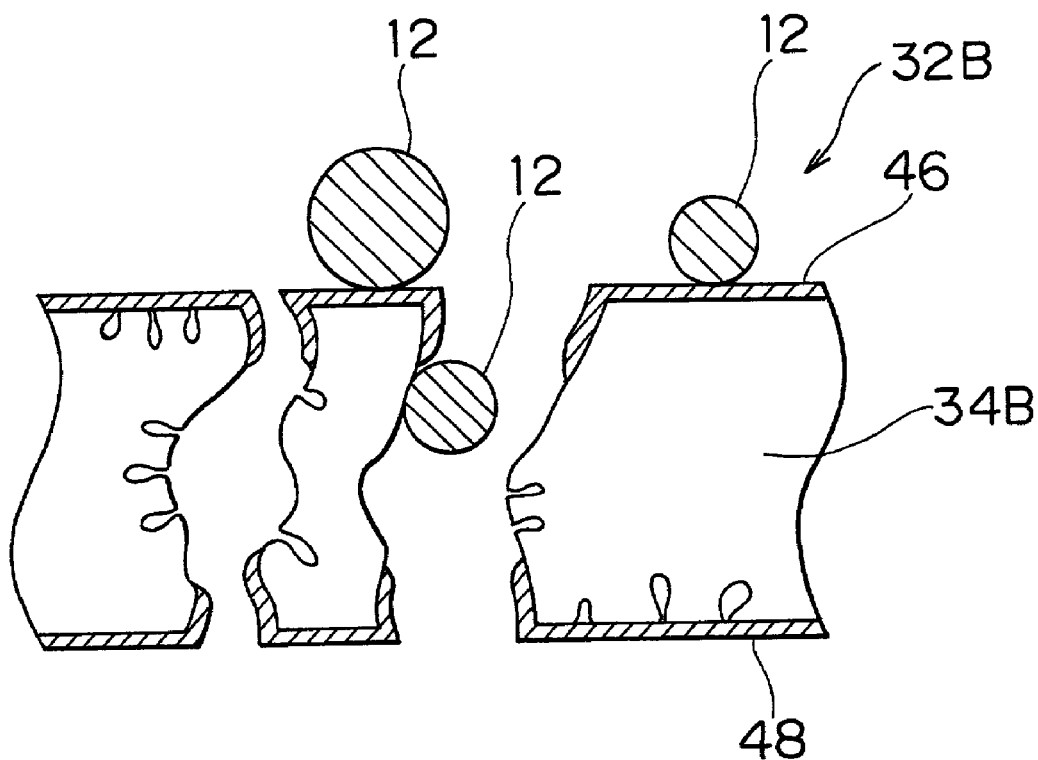
FIG. 4 is an enlarged schematic diagram that schematically shows on an enlarged scale a partition of a honeycomb filter according to the second embodiment of the invention.

Next, a second embodiment of the invention will be described. FIG. 4 shows a partition 34B of a honeycomb filter 32B of the second embodiment. The second embodiment is identical with the first embodiment in other respects. That is, the block diagram shown in FIG. 1 is also applicable to the second embodiment, and the soot removing routine shown in FIG. 3 is also applicable without any modification. Therefore, description thereof will be omitted. In the second embodiment, as shown in FIG. 4, a partial oxidation catalyst (e.g., platinum (Pt), palladium (Pd) and the like) 46 that is highly active in a partial oxidation reaction is carried on a surface of the partition 34B of the honeycomb filter 32B on the side of the raw material supply flow passage 40, and a reforming catalyst (e.g., rhodium (Rh), nickel (Ni) and the like) 48 that is highly active in a water vapor reforming reaction of hydrocarbon fuel is carried on the partition 34B on the side of the processed gas flow passage 42.

In the honeycomb filter 32B, reaction heat that has been generated on the partial oxidation catalyst 46 due to partial oxidation is supplied to the reforming catalyst 48 that is immediately adjacent to the partial oxidation catalyst 46, by sensible heat of gas and propagation in the partition 34B. This reaction heat is used for a water vapor reforming reaction that is caused on the reforming catalyst 48. That is, the reaction heat resulting from partial oxidation can be used for a water vapor reforming reaction that is caused on the reforming reaction 48, without being lost, for example, through radiation of heat to the outside of a reaction vessel.

In the fuel reforming apparatus 20 of the first and second embodiments described hereinbefore, the honeycomb filter 32 traps the soot 12 and causes a reforming reaction. However, the honeycomb filter 32 may be designed only to cause a reforming reaction. In this case, a soot removing filter for trapping the soot 12 is disposed upstream of the honeycomb filter 32. This leads to an increase in degree of freedom in determining an effective diameter of the gaps in the partition 34.

In the fuel reforming apparatus 20 of the first and second embodiments, the honeycomb filter 32 is employed. However, any member can be employed that has the function of filtration. For example, it is possible to adopt a construction with a plurality of layers, each of which has a partition that is made from a porous material and that is interposed between a sheet-like raw material supply flow passage and a sheet-like processed gas flow passage.

Further, in the fuel reforming apparatus 20 of the first and second embodiments, the soot removing routine is executed at intervals of a selected period (e.g., 2 h) to remove the soot 12 trapped by the partition 34 by combustion. However, the soot removing routine may be executed if a selected or predetermined period has elapsed since termination of warming-up in a starting process of the fuel reforming apparatus 20.

Furthermore, in the fuel reforming apparatus 20 of the first and second embodiments, the electronic control unit 60 executes the soot removing routine as a processing program to increase the amount of air introduced by the blower 26 and thus remove the soot 12 trapped by the partition 34. However, the soot 12 may be removed by supplying the reforming portion 30 with a selected amount of air if a timer has measured the lapse of a selected period.

In the fuel reforming apparatus 20 of the first and second embodiments, gasoline is used as hydrocarbon fuel. However, the invention is also applicable to fuel reforming apparatus that use hydrocarbon fuel other than gasoline, i.e., various types of gaseous and liquid hydrocarbon fuel including saturated hydrocarbons such as methane, ethane and the like; unsaturated hydrocarbons such as ethylene, propylene and the like; and alcohol groups such as methanol, ethanol and the like. In this case, the invention is applicable to a fuel reforming apparatus using raw gas that does not include soot, as well as to a fuel reforming apparatus using raw gas that includes soot.

Furthermore, in the fuel reforming apparatus 20 of the above-described embodiments, gasoline is used as hydrocarbon fuel and a shift reaction occurs after a reforming reaction. However, in the case where gaseous hydrocarbon fuel is used, gasification in the gasifying/mixing portion 28 is unnecessary. In a fuel reforming apparatus of a type wherein a reforming reaction and a shift reaction occur simultaneously, there is no need to provide the shift portion 52.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel reforming apparatus comprising:
a reforming catalyst that reforms raw gas including hydrocarbonic fuel into reformed gas including hydrogen; and
a honeycomb filter comprising a plurality of partitions that are made of a first material and that are structured to form:
a raw material supply flow passage that causes the raw gas to flow along a first face of the plurality of partitions and that supplies the raw gas to the filter; and a processed gas flow passage that causes reformed and filtered gas to flow along a second face of the plurality of partitions, wherein:

the plurality of partitions are comprised of an interstitial material including a plurality of gaps having an effective diameter from 10 to 100 μm for trapping soot that is generated in the raw gas due to the hydrocarbonic fuel, the reforming catalyst is carried by the plurality of partitions on the second face on the side of the processed gas flow passage, and the first face of the plurality of partitions on the side of the raw material supply flow passage is only coated by an inactive second material.

2. The fuel reforming apparatus according to claim 1, wherein:

the raw material supply flow passage causes the raw gas to flow along the first face and substantially parallel thereto, and the processed gas flow passage causes the reformed and filtered gas to flow along the second face and substantially parallel thereto.

3. The fuel reforming apparatus according to claim 2, wherein the plurality of partitions are constructed using a monolithic carrier made from the interstitial material.

4. The fuel reforming apparatus according to claim 3, wherein the interstitial material forming the plurality of partitions is formed from one of a porous material, a mesh material, a foamed material, non-woven fabric, and a sintered material.

5. The fuel reforming apparatus according to claim 1, wherein the inactive material is alumina.

6. The fuel reforming apparatus according to claim 1, wherein the reforming catalyst is additionally carried by the plurality of partitions also on an entire surface of the gaps.

7. The fuel reforming apparatus according to claim 1, further comprising:

a raw material preparing portion that gasifies hydrocarbonic fuel and that mixes air with water vapors to prepare raw gas, wherein the raw material preparing portion can increase an amount of air by a predetermined amount with respect to raw gas.

8. The fuel reforming apparatus according to claim 1, wherein the porous material forming the plurality of partitions is formed from one of a porous material, a mesh material, a foamed material, non-woven fabric, and a sintered material.

9. A fuel reforming apparatus comprising:

reforming means for reforming raw gas including hydrocarbonic fuel into reformed gas including hydrogen using a reforming catalyst; and soot trapping means that are made of a first material for trapping soot generated in the raw gas, wherein:

the soot trapping means includes a plurality of gaps having an effective diameter from 10 to 100 μm for trapping soot that is generated in the raw gas due to the hydrocarbonic fuel, a first face of the soot trapping means is only coated by an inactive second material, the reforming means is carried by the soot trapping means on a second face of the soot trapping means, and the soot trapping means comprises a honeycomb filter.

10. The fuel reforming apparatus according to claim 9, wherein the honeycomb filter comprises interstitial material that includes the plurality of gaps.

11. The fuel reforming apparatus according to claim 9, further comprising soot removing means for removing soot that has been trapped by the soot trapping means.

12. The fuel reforming apparatus according to claim 11, wherein the soot removing means contacts soot that has been trapped by the soot trapping means with oxygen-containing gas.

13. A fuel reforming apparatus comprising:

a reforming catalyst that reforms raw gas including hydrocarbonic fuel into reformed gas including hydrogen;

a filter comprising a plurality of partitions that are made of a first material and that are structured to form:

a raw material supply flow passage that causes the raw gas to flow along a first face of the plurality of partitions and that supplies the raw gas to the filter; and a processed gas flow passage that causes reformed and filtered gas to flow along a second face of the plurality of partitions, wherein:

the reforming catalyst is carried by the plurality of partitions on the second face on the side of the processed gas flow passage, the plurality of partitions are comprised of an interstitial material including a plurality of gaps for trapping soot that is generated in the raw gas due to the hydrocarbonic fuel, and the first face of the plurality of partitions on the side of the raw material supply flow passage is only coated by an inactive second material.

* * * * *